United States Patent
Chen et al.

(10) Patent No.: US 7,382,333 B2
(45) Date of Patent: Jun. 3, 2008

(54) DISPLAY PROCESSING SWITCHING CONSTRUCT UTILIZED IN INFORMATION DEVICE

(75) Inventors: Yu Chen, Taipei (TW); Yun-Ping Liu, Chilung (TW); Sung-Yuan Chen, Taipei (TW); Min-Chih Chin, Taipei (TW)

(73) Assignee: Elitegroup Computer Systems Co., Ltd., Taipei (TW)

( * ) Notice: Subject to any disclaimer, the term of this patent is extended or adjusted under 35 U.S.C. 154(b) by 722 days.

(21) Appl. No.: 10/940,022

(22) Filed: Sep. 14, 2004

(65) Prior Publication Data

US 2006/0007203 A1 Jan. 12, 2006

(30) Foreign Application Priority Data

Jul. 9, 2004 (TW) .............................. 93210891 U

(51) Int. Cl.
*G06T 1/00* (2006.01)
(52) U.S. Cl. .............................. 345/1.1; 345/5; 345/98; 345/204; 345/502; 345/522; 348/500
(58) Field of Classification Search ................. 345/1.1, 345/5, 87, 98, 99, 204, 211, 213, 502, 522; 348/500
See application file for complete search history.

(56) References Cited

U.S. PATENT DOCUMENTS

| | | | | |
|---|---|---|---|---|
| 4,821,208 A | * | 4/1989 | Ryan et al. | 345/550 |
| 5,103,224 A | * | 4/1992 | Arad | 340/959 |
| 6,063,420 A | * | 5/2000 | Chun et al. | 426/231 |
| 6,664,970 B1 | * | 12/2003 | Matsushita | 345/581 |
| 6,822,647 B1 | * | 11/2004 | Kim | 345/213 |
| 2003/0020721 A1 | * | 1/2003 | Kanzaki et al. | 345/539 |
| 2004/0041814 A1 | * | 3/2004 | Wyatt et al. | 345/556 |
| 2004/0125248 A1 | * | 7/2004 | Song | 349/38 |
| 2004/0207977 A1 | * | 10/2004 | Chen et al. | 361/683 |

* cited by examiner

*Primary Examiner*—Bipin Shalwala
*Assistant Examiner*—Vincent E. Kovalick
(74) *Attorney, Agent, or Firm*—Rosenberg, Klein & Lee

(57) ABSTRACT

A display processing construct utilized in information device, discloses a first and a second display processing devices. The display signal outputs from the first and second display processing devices are against the switches separately, wherein the switching of switches are utilized to choose or control the delivery of display signal from the first or the second display processing devices to the displayer. Further a selector is used to control or choose the contact of the switch of the first or second display processing devices so as to deliver the display signal from the first or the second display processing devices to the displayer and contain the power supply module to offer the power to said selected display processing device. The user can choose the appropriate display processing device according to the desirable effectiveness of the displaying and further advance the function of the information device and save the power of the battery.

23 Claims, 3 Drawing Sheets

DISPLAY PROCESSING SWITCHING CONSTRUCT UTILIZED IN INFORMATION DEVICE

BACKGROUND OF THE INVENTION

1. Field of the Invention

The present invention is related to a display processing construct, especially a plurality of display processing devices installed in the information device so that the user can switch the module according to the requirement to select an appropriate display processing device so as to manage a better image display effectiveness.

2. Description of the Related Art

In the busy twenty-first century, the convenient portable information devices for the workers are regarded as very important companies. Such as the notebook computer and portable electronic device can offer the workers to deal with affairs, including in time checking and sending e-mails, writing report, usual data processing, and son on, whenever in the long commutation so as to save time. Moreover, it can even relax the exhaustion in the long trip by displaying music or video. In addition, the workers who often get out to hold meeting so as to brief or introduce the company's products can utilize the portable information device to make meeting record, briefing, or product introducing so as to dispense the heavy document, presentation data, or product posters, thus facilitating the convenience and efficiency on the job.

Following the requirement of people, the function of the computer software has been evolving strongly and completely, especially the image processing function. Therefore, that forces the display processing device, such as display card or display chipset, installed in the information device, to comply with high efficiency so as to be compatible with the computer software with high display efficiency such as 3D drawing software, 3D image processing software, game software, and so on. In the contrary, the utilized display processing device with high efficiency would definitely gorge more power, but if the information device performs the low efficiency display software by high efficiency display processing device, it would shorten the life of information device after a long time of using the power supply of battery. However, at this moment, the information device can only be installed with a display processing device and that would cause the inconvenience to the users.

Therefore, the present invention is to propose a kind of display processing construct utilized in the information device to conquer the failure that the conventional information deice can be installed with only a display processing device. The information device is installed with a plurality of display processing devices to offer the user to switch to an appropriate display processing device according to the running environment of information device to conquer the above-mentioned problem.

SUMMARY OF THE INVENTION

The main purpose of the present invention is to offer the user to switch a high efficiency display processing device by installing a high efficiency display processing device and a low efficiency display processing device in the information device as using the computer software with high display efficiency so as to advance the using function of information device.

The other purpose of the present invention is to offer a display processing construct utilized in information device by installing a high efficiency display processing device and a low efficiency display processing device in the information device so as to offer the user to transfer to low efficiency display processing device as running in the low efficiency environment or performing low efficiency computer software, thus punching down the consumed power of portable information device, saving power, and further enhancing the using time of information device.

The present invention is applied in the display processing construct of the information device, wherein a first and a second display processing devices are included to process display signals; a microprocessor is utilized to drive the first or second display processing device, a switching module is utilized to control or choose the display signal from the first or second display processing device; a power supply module is used to offer power to said first display processing device, second display processing device, microprocessor, and switching module. Wherein, the switching module further comprises a first and a second switches against said first and second display processing devices separately to transmit the display signal to the displayer. Besides, a selector is utilized to control and choose the power supply circuit of the power supply module and the contact of the first and the second switches so as to let said first or second display processing devices transmit display signal to a displayer and play image.

To have a further understanding about the features of the structure and the achieved effects, of the present invention, the preferred embodiment and detailed description are unfolded as following.

DETAILED DESCRIPTION OF THE PREFERRED EMBODIMENT

The present invention is to offer the user to choose appropriate display processing device according to the displaying efficiency requirement of the computer software performed by the information device by installing a plurality of display processing devices in the information device so as to advance the using function of information device, punch down the consumed power, and further enhance the using time of information device.

Figure 1:
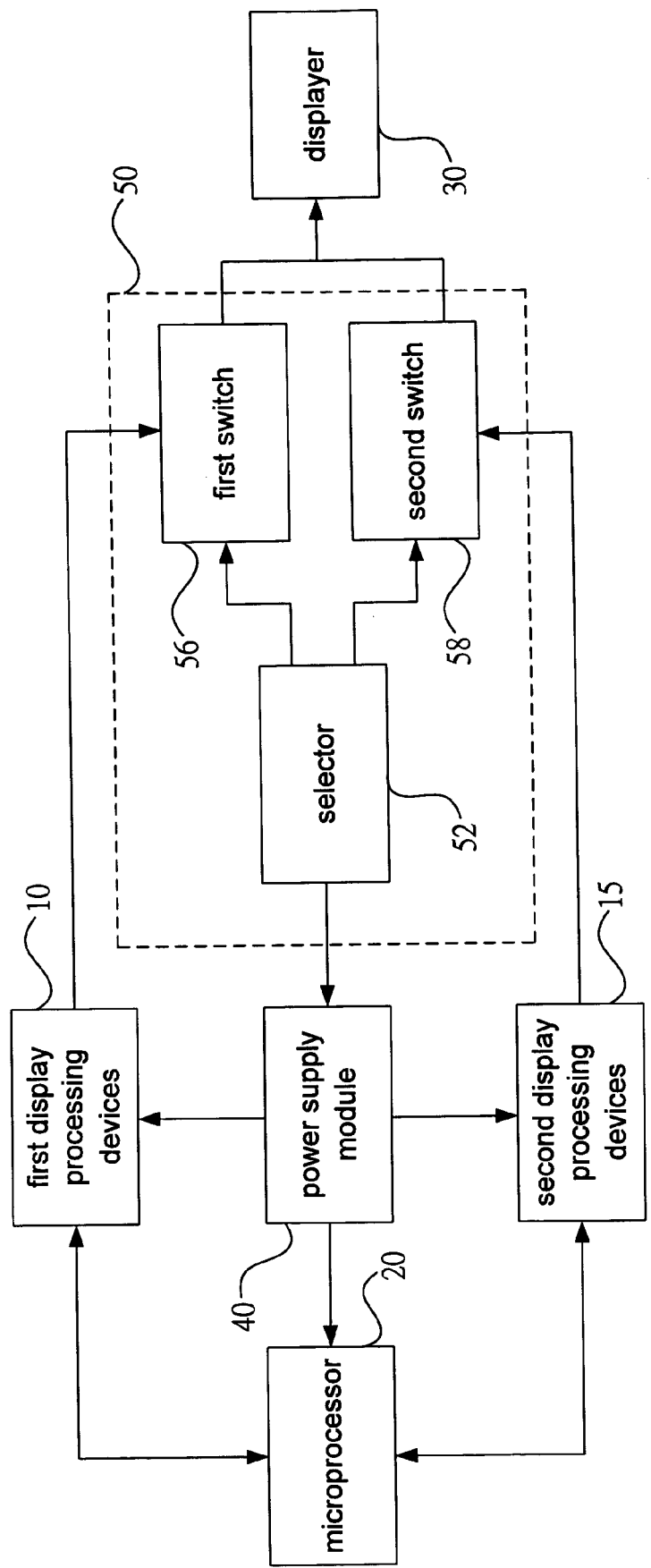
FIG. 1, the first preferred embodiment of implementation block diagram, is the display processing switching construct in the information device of the present invention.

FIG. 1 depicts the implementation block diagrams of display processing construct utilized in information device. As shown in FIG. 1, which is the preferred embodiment of the present invention, the information device is installed with a first display processing device 10 and a second display processing device 15, and the information device can be a notebook computer. And the two display processing devices 10 and 15 refer to low efficiency and high efficiency display processing devices separately. After the display efficiency test by 3D Bench Mark 2001, the score under 1500 would be classified as first display processing device 10, and the score above 1500 would be regarded as the second display processing device 15. Wherein, the first and second display processing devices 10 and 15 refer to the display card or display chipset such as VGA (Video Graphic Array), SVGA (Super VGA), or XGA (Extended Graphic Array).

A microprocessor 20 is to drive the two display processing devices 10 and 15 and receive the display information from the display processing devices 10 and 15, and send back the processed display information to the display processing devices 10 and 15 for proceeding. The processed display information is stored in the random access memory of the two display processing devices 10 and 15, and at last, the digital display information is transferred into analog display signal by random access memory digital/analog converter (RAMDAC) of the two display processing devices 10 and 15, and delivered to a displayer 30 so as to present images.

A power supply module 40 is to offer power to all hardware devices of the information device. And a switching module 50 comprises a selector 52, a first switch 56, and a second switch 58. The selector 52 is offered for the used to choose the first low efficiency display processing device 10 or the second high efficiency display processing device 15 according to the display efficiency of the intended computer software. The selector 52 refers to an electronic switch, or button on the keyboard for the user to press and choose, or set choices of basic input output system in information device (i.e., additionally setting a selective fixed item of display processing device in the basic input output system for the user to choose and transfer between the two display processing devices 10 and 15).

Because the displayer 30 only have a display signal input port, the two switches 56 and 58 would be switched to transfer the two display processing devices 10 and 15 alternatively so as to transmit the display signal to the displayer 30. The two switches 56 and 58 of switching module 50 are separately against two display processing devices 10 and 15, and under the contact state of the two switches 56 and 58, the two display processing devices 10 and 15 would be able to convey display signal to the displayer 30 via the two switches 56 and 58 to show the images. The selector 52 controls the two switches 56 and 58. After the selector 52 being operated by the user, the selector 52 would maneuver the power supply module 40 to switch power supply circuit according to the display processing device 10 or 15 selected by the user and transmit signal to the corresponding switch 56 or 58 to control the contact of switch 56 or 58. For example, if the selector 52 transmits a low voltage level 0, it would enable the contact of the first switch 56, and for the same reason, if the signal is high voltage level 1, it would enable the contact of the second switch 58.

Figure 2:
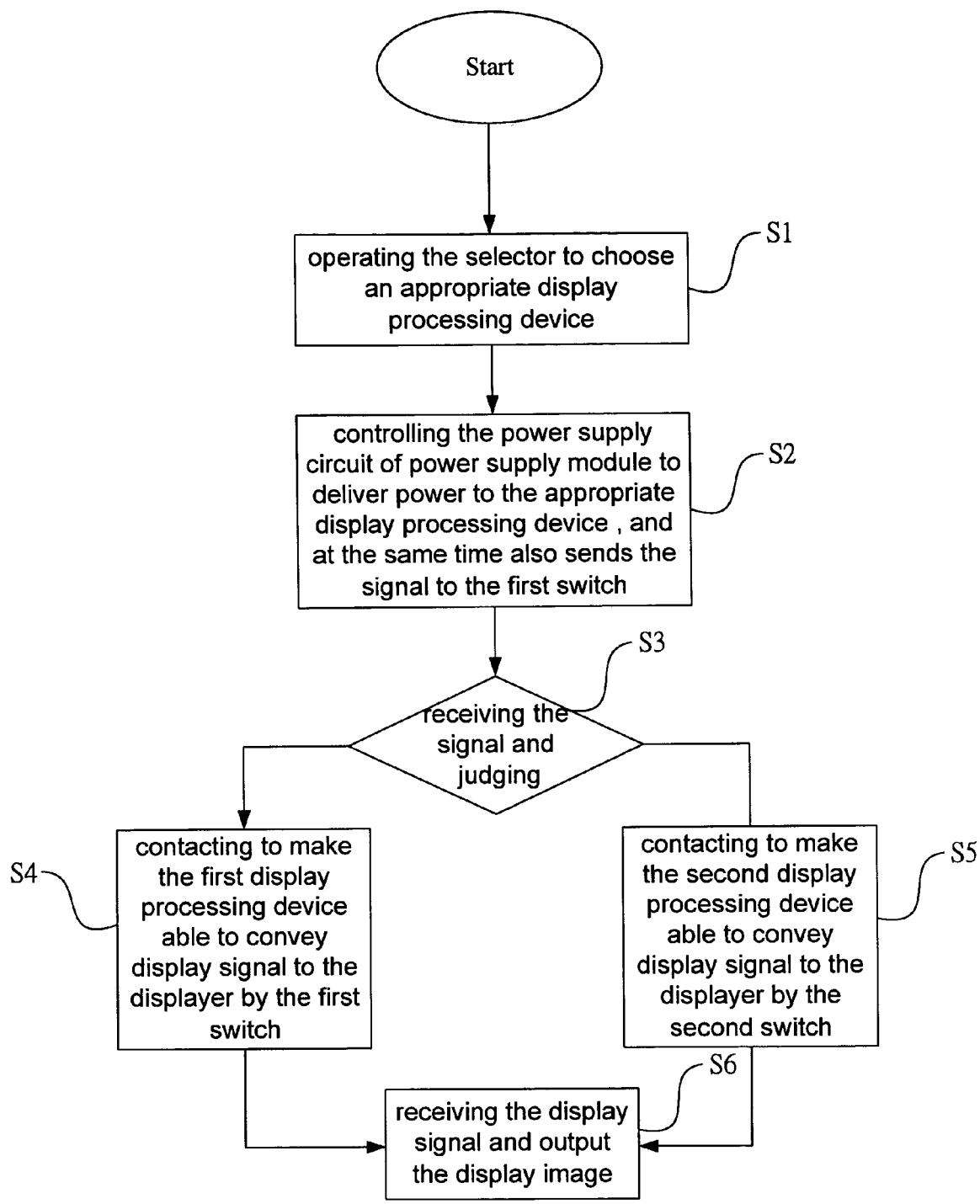
FIG. 2, the implementation flow chart, is the display processing switching construct in the information device of the present invention.

With FIG. 1 for reference, FIG. 2 is the embodiment flow chart of display processing construct utilized in information device of the present invention. As the user intends to run the computer software, such as performing a general documentation for example in the preferred embodiment of the present invention, step S1 indicates that the user operates the selector 52 to choose an appropriate display processing device 10 or 15, such as pressing the preset button on the keyboard to choose a first low efficiency display processing device 10. Then, when the user presses to start the device, meanwhile as shown in step S2, the selector 52 controls the power supply circuit of power supply module (without depicted picture) 40 only to deliver power to the first display processing device 10, and at the same time also transmits the signal to the first switch 56. Following, the first switch 56 as shown in step S3 receives the signal and judges whether it is low voltage level signal or not, and if yes, the step S4 will be proceeded. The first switch 56 will be contacted to make the first display processing device 10 able to convey display signal to the displayer 30. At last, the displayer 30 as shown in step S6 is to receive the display signal and output the display image.

On the contrary, if the user would like to perform high display efficiency computer software such as 3D drawing software, 3D image processing software, and game software on the information device, the preset button can be pressed to select the second high efficiency display processing device 15. As the user presses the power supply button to start, the selector 52 would control the power supply circuit of the power supply module 40 to deliver power to the second display processing device 15 and to transmit the high voltage level signal to the second switch 58. Following, as shown in step S5, the second switch 58 is enabled to get contact and further makes the second display processing device 15 to transmit display signal to the displayer 30, and at last, as shown in step S6, the displayer receives the display signal and show the image.

Therefore, as using the general low display efficiency computer software, the present invention can offer the users selecting the first low display efficiency display processing device 10 to decrease the consumed energy of battery of information device and to advance the using time of information device. While running the high display efficiency computer software, the second high efficiency display processing device 15 is selected to enhance the display efficiency of the information device.

Figure 3:
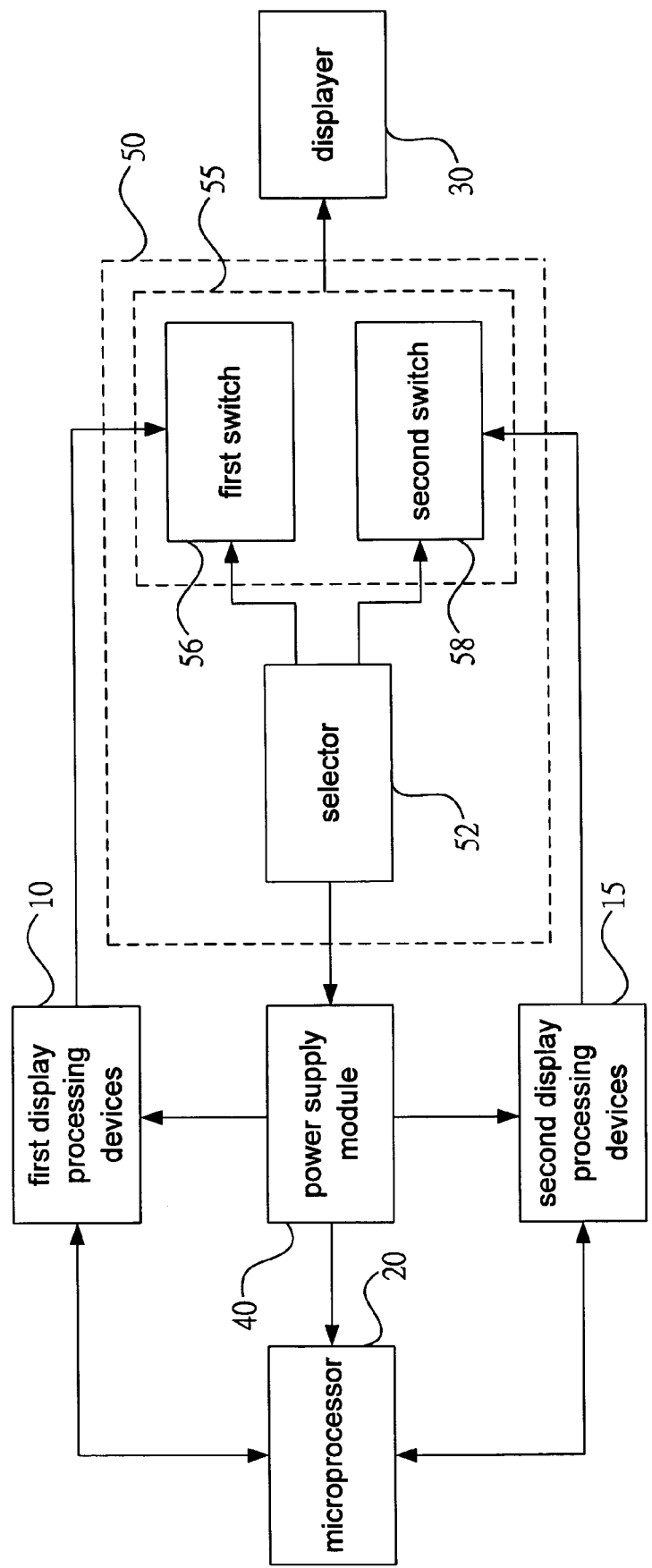
FIG. 3, the second preferred embodiment of implementation block diagram, is the display processing switching construct in the information device of the present invention.

FIG. 3 is another preferred embodiment of implementation block diagram in the present invention. As shown in FIG. 3, the first switch 56 and the second switch 58 are modularized into a switch module 55, and the functions of other devices are the same as shown in the first embodiment. Besides, the transmission interface between the selector 52 and the switch module 55 can be single direction transmission as shown in the figure. The first and the second switches 56 and 58 are simultaneously enabled to receive the transmitted voltage level signal from the selector 52, but each individually responds the level signal to get contact. For example, the first switch 56 only responds the low voltage level signal to get contact and the second switch 58 only responds the high voltage level signal to get contact.

In conclusion, a plurality of display processing devices 10 and 15 are installed in the information device in the present invention to offer the user to choose the appropriate display processing device 10 or 15 according to the requirement of the performed software. While running the low display efficiency software, the first low display efficiency display processing device 10 is selected to improve the power consuming problem of battery in the conventional art that the high efficiency display processing device is used in the information device. While running the high display efficiency computer software, the second high efficiency display processing device 15 can be selected to enhance the using function of the information device.

In conclusion, this invention definitely achieves creativity, improvement, and more usability for the users in the industry. This being the case, it should be qualified for the patent applications in the intellectual patent regulation of our country, thus being proposed for the approval of the patent. Looking forward to the kind rendering of the approval at the earliest convenience.

The above-mentioned practice is only a preferred embodiment of this invention, not the specified limit of it. All the parallel changes and revisions of the shape, the structure, the feature, and the spirit evolving from this invention should be included in the field of the claimed patent of this invention.

What is claimed is:

1. A display processing switching construct utilized in information device comprising:
   a first display processing device;
   a second display processing device;
   a microprocessor to drive the first display processing device or the second display processing device;
   a displayer to receive the display signal from the first display processing device or the second display processing device and to present the image;
   a first switch to switch the display signal of the first display processing device to the displayer under the contact condition;
   a second switch to switch the display signal of the second display processing device to the displayer under the contact condition;
   a power supply module to offer the power to each hardware device of the information device; and
   a selector choosing which display processing device to output display signal, controlling the power supply circuit of the power supply module to offer power to the display processing device, and enabling the contact of the switch corresponding to the display processing device so as to make the display signal being transmitted to the displayer.

2. The display processing construct as claimed in claim 1, wherein the first display processing device refers to a low efficiency display processing device and the second display processing device refers to a high efficiency display processing device.

3. The display processing construct as claimed in claim 1, wherein the first display processing device refers to a display chipset or display card.

4. The display processing construct as claimed in claim 1, wherein the second display processing device refers to a display chipset or display card.

5. The display processing construct as claimed in claim 1, wherein the selector refers to an electronic switch.

6. The display processing construct as claimed in claim 1, wherein the selector is a selective item of display processing device of basic input output system in the information device.

7. The display processing construct as claimed in claim 1, wherein the information device refers to a notebook computer.

8. A display processing switching construct utilized in information device comprising:
   a first display processing device;
   a second display processing device;
   a microprocessor driving the first display processing device or the second display processing device;
   a displayer receiving the display signal from the first display processing device or the second display processing device and presenting image;
   a switch module transmitting the display signal to the displayer;
   a power supply module offering power to each hardware device in the information device; and
   a selector choosing which display processing device to output display signal, controlling the power supply circuit of the power supply module to offer power to the display processing device, and enabling the switch module to get contact and to transmit the display signal to the displayer.

9. The display processing construct as claimed in claim 8, wherein the switch module further comprises a first switch and a second switch corresponding to the display signal of the first display processing device or the second display processing device under the contact state, and the switch against the display processing device, which delivers display signal, can be enabled by the selector to transmit display signal to the displayer.

10. The display processing construct as claimed in claim 8, wherein the first display processing device refers to a low efficiency display processing device and the second display processing device refers to a high efficiency display processing device.

11. The display processing construct as claimed in claim 8, wherein the first display processing device refers to a display chipset or display card.

12. The display processing construct as claimed in claim 8, wherein the second display processing device refers to a display chipset or display card.

13. The display processing construct as claimed in claim 8, wherein the selector refers to an electronic switch.

14. The display processing construct as claimed in claim 8, wherein the selector refers to a selective item of display processing device of basic input output system in an information device.

15. The display processing construct as claimed in claim 8, wherein the information device refers to a notebook computer.

16. A display processing switching construct utilized in information device comprising:
   a first display processing device;
   a second display processing device;
   a microprocessor driving the first display processing device or second display processing device;
   a displayer receiving the display signal from the first display processing device or second display processing device and presenting image;
   a power supply module offering power to each hardware of the information device; and
   a switching module controlling and choosing the display signal from the first display processing device or the second display processing device;
   wherein the first display processing device refers to a low efficiency display processing device and the second display processing device refers to a high efficiency display processing device.

17. The display processing construct as claimed in claim 16, wherein the switching module further comprises a switch module transmitting the display signal to the displayer; and a selector choosing the display processing device to transmit the display signal, controlling the power supply circuit of the power supply module to the intended display processing device to output display signal, and enabling the contact of the switch module to transmit display signal to the displayer.

18. The display processing construct as claimed in claim 17, wherein the switch module further comprises a first switch and a second switch against the displayer signal from the first display processing device or the second display processing device under the contact state, and the intended switch, which conveys the display signal, can be enabled to get contact and make the display signal being delivered to the displayer.

19. The display processing construct as claimed in claim 16, wherein the first display processing device refers to a display chipset or display card.

20. The display processing construct as claimed in claim 16, wherein the second display processing device refers to a display chipset or display card.

21. The display processing construct as claimed in claim 16, wherein the selector refers to an electronic switch.

22. The display processing construct as claimed in claim 16, wherein the selector refers to a selective item of display processing device of basic input output system in an information device.

23. The display processing construct as claimed in claim 16, wherein the information device refers to a notebook computer.

* * * * *